2,930,702

PROCESS OF PRESERVING DRESSED POULTRY

Robert Winterbottom, Pearl River, N.Y., and Harry P. Broquist, Woodcliff Lake, and Alvin Richard Whitehill, Montvale, N.J., assignors to American Cyanamid Company, New York, N.Y., a corporation of Maine No Drawing. Application March 28, 1956
Serial No. 574,392

7 Claims. (Cl. 99—157)

This invention relates to the treatment of dressed poultry. More particularly, this invention relates to the treatment of eviscerated poultry with solutions of antibiotics whereby a prolonged shelf life of the poultry is obtained and a composition useful in performing this treatment. The term "poultry" as used herein includes the flesh of all edible birds, such as, chickens, turkeys, ducks, geese, squab, and many others wherein the same problem of preservation of the flesh after slaughter is important.

It is customary in the poultry industry to chill freshly killed poultry in an ice-water bath for periods ranging from ½ to 4 hours for the purpose of reducing the temperature of the poultry and to minimize subsequent bacterial growth. The chilled poultry is then removed from the ice bath, packaged by conventional methods, and distributed. Unless the poultry is frozen, which may be uneconomical or for other reasons unfeasible, decomposition takes place very quickly, and the meat soon becomes inedible. This short shelf life has been a very serious handicap to the poultry industry and has necessitated many smaller slaughter houses, which are able to serve only a relatively small area. These small plants are often inefficient and unsanitary. Moreover, they are extremely difficult to control by health authorities in view of their number. An improvement in the processing of fresh poultry is obviously desirable.

Tarr et al. have employed antibiotics in the preservation of fish, and Deatherage et al. have used antibiotics in the preservation of beef. Kohler et al. have shown in Food Technology, vol. 8, May 1954, page 19, that chlortetracycline is effective in increasing the shelf life of poultry 7–14 days when freshly killed chickens are dipped in water containing 3–30 parts per million chlortetracycline and subsequently stored at 40° F. The present invention deals with this discovery and improvements in the process, whereby results superior even to those described in the Food Technology article are obtained. By use of the composition of this invention, the shelf life of poultry can be increased to at least 21 days.

It has now been found that when tetracycline antibiotics and their metallic and acid salts are dissolved in tap water in concentrations of from about 1000 to 10,000 p.p.m., and maintained at a temperature near that of the poultry houses (90° F.) or at room temperature (70° F.), a scum forms during the dissolving operation and cloudiness and precipitation take place on standing. It has also been observed that neither the scumming, cloudiness, nor the precipitation occurs in deionized water. The reasons or reason for this scumming, cloudiness and precipitation are not fully understood. It may be that they are due to some decomposition of the antibiotic. Alternatively, it may be that an insoluble form of the antibiotic is formed in the tap water. Whatever the cause, a loss of available soluble antibiotic results. The utilization of the full measure of the antibiotic sold to the consumer by minimizing handling losses of this nature is of primary importance because of the high cost of the antibiotic; also it is very desirable to insure the potency of the solution recommended to the consumer.

It has now been found that if a solid, non-toxic, water-soluble acid is added to the antibiotic, no scumming, cloudiness, or precipitation results. This is true at the 1000 p.p.m. level of the antibiotic and the 10,000 p.p.m. level as well as intermediate level such 5,000 p.p.m. It should be noted that the highest value mentioned above approaches the limit of solubility of chlortetracycline hydrochloride in deionized water. At even this concentration, with the added acid, there was no scumming, cloudiness, or precipitation even after standing approximately 16 hours in tap or hard water.

It is reasonably certain that this phenomenon is not one attributable to the pH effect of the acid. This is borne out in the tables below by the desirable results obtained with deionized water containing no acid, the pH ranges of which were similar to the tap water solutions containing no acid. Also it is to be noted in the tables below that the pH ranges of the antibiotic solutions without the citric acid were fairly close to those with the citric acid; in some cases, the difference between the pH values with and without citric acid are not even remotely statistically significant. It might be suggested that the antibiotic is precipitated out as the free base. However, this hypothesis is refuted by the tables below which show that precipitation, scumming, etc., occur at the higher temperatures (70° F. and 90° F.) where the free base is quite soluble. Moreover, this hypothesis is refuted in a more striking manner when one considers that there is none of the cloudiness, precipitation or scumming at the lower temperature (40° F.) where the free base would be expected to come out of solution. For these reasons, it is seen to be highly unexpected that the acid should prevent this undesirable loss of the antibiotic in solution.

The antibiotic of this invention may be any of the tetracycline antibiotics or derivatives thereof, for example, chlortetracycline, tetracycline, or oxytetracycline. These may be present as the free base or any of the soluble non-toxic acid or metallic salts thereof. The hydrochloride of any of these antibiotics is of particular interest as this form is the most readily obtainable commercial form thereof. Other acid salts are of interest also, e.g. the sulfate. Examples of the metallic salts are the sodium and potassium salts. Other derivatives also have proved useful. These antibiotics form complexes with aluminum; see Patents Nos. 2,640,842 and 2,736,725. The complexes of either of these patents may be used in this invention, for example, the complex—chlortetracycline aluminum citrate, the complex—chlortetracycline aluminum glucontate, etc. Chlortetracycline is the antibiotic of choice because it has the property of being destroyed when the poultry is cooked; the hydrochloride is its preferred form because of its commercial availability.

The acid to be used may be any one that is solid, non-toxic and water-soluble. Some examples of such acids are citric acid, gluconic acid, tartaric acid, lactobionic acid, malic acid, ascorbic acid and itaconic acid.

The proportions of the acid to the antibiotic will vary from 1 to 3 parts by weight of the acid to 1 part by weight of the antibiotic. The composition of this invention is initially made up as a dry mixture preferably containing the antibiotic, the acid, a trace amount of an inert non-toxic surface active agent and the residue comprising an inert non-toxic water-soluble diluent.

The wetting agent or surface active agent may be any of a number of the available wetting agents. For examples, it may be a non-ionic surface active fatty acid ester of higher polyglycols such as dipropyleneglycol-mono-oleate known as Nonisol. Alternatively, this wetting agent may be one of several of the Pluronics. The Pluronics have the following structural formula:

wherein $x=3.4$ to $18.5$ and $y=2.6$ to $24.8$. Another example of commercially available non-toxic wetting agents are the Tweens. Tween 80, in fact, is the preferred wetting agent for the instant invention; it comprises polyoxyethylene sorbitan mono-oleate. The diluent can be any inert non-toxic water-soluble diluent. Sugar and sodium chloride have been tried and found to be satisfactory, sodium chloride being preferred. Other equivalent surface active agents and diluents, of course, will be apparent to those skilled in the art. The preferred composition as indicated above contains one of these surface active agents and one of these diluents. However, neither the diluent nor the surface active agent is essential.

In terms of percent by weight, the composition of this invention should be one containing about 3 to 30% of the antibiotic, about 3 to 30% of the acid, about 1% of the surface active agent and the residue being made up of the diluent. The preferred composition is one containing about 10% chlortetracycline, 10% citric acid, 1% Tween 80 (polyoxyethylene sorbitan mono-oleate), and 79% sodium chloride (all percentages being by weight).

In commercial operation the dry composition described above is diluted with water to produce a stock solution containing above 1000 p.p.m. of the antibiotic. This concentration of the antibiotic in the stock can run as high as 10,000 p.p.m., or it might run much lower, for example, 500 p.p.m. However, the concentration 1000 p.p.m. is preferred, because if one goes below 1000 p.p.m., then the volume of liquid becomes excessively large and difficult to handle. If one goes to the other extreme, that of the 10,000 p.p.m., the antibiotic will be difficultly soluble in the water.

The recommended concentration of the antibiotic in the solution in which the poultry will ultimately be dipped may run anywhere from 3 p.p.m. to about 30 p.p.m. The preferred concentration of the antibiotic is that of about 10 p.p.m. Thus the procedure in preparing the solution in which the poultry is to be dipped is merely one of running a sufficient quantity of the stock solution into water to form a solution containing approximately 10 p.p.m. of the antibiotic.

By following this procedure one will produce a poultry dip solution containing in water about 10 p.p.m. of the antibiotic, about 10 p.p.m. of citric acid, about 1 p.p.m. of the non-toxic surface active agent, and about 79 p.p.m. of the inert non-toxic water-soluble diluent. This is the preferred composition of the dipping solution. The various amounts of the various constituents can however, be varied. The amount of the antibiotic should not exceed about 30 p.p.m., since amounts greater than this are not always removed by cooking. At the other extreme, amounts lower than 3 p.p.m. have been found not to be consistently effective in preserving poultry. The cost of the antibiotic and the other constituents is of course a major factor also in determining what quantities should be used in the dipping solution. Therefore, about 3 to 90 p.p.m. of citric acid, about 0.3 to 3 p.p.m. of the surface active agent, and about 60 to 240 p.p.m. of the inert water-soluble diluent are recommended.

In carrying out the dipping procedure, freshly killed poultry, after being cleaned in the customary manner, is immersed in an ice water bath containing the above-described dipping solution. After the flesh has been chilled it is removed from the antibiotic bath and packaged by conventional methods, after which it can be distributed to the retail market.

The poultry should remain in the dipping solution at least ½ hour. In this period, enough of the antibiotic is absorbed in the chicken flesh for adequate protection. A longer period of time, up to several hours is more desirable, since more of the antibiotic will be absorbed; two hours is preferred. The poultry should not be washed after the dipping process because it is the antibiotic on the surface which retards the bacterial growth. Individual packaging of poultry at the processing plant now made possible by the longer shelf life from the use of this antibiotic dipping process is a further safe guard against surface removal of the antibiotic and against bacterial contamination of the poultry during subsequent handling enroute to the consumer.

To illustrate the advantages of the present invention a number of tables will be given to point out the effectiveness of the procedures to be described and claimed herein. Quantitatively the results are expressed in terms of microorganisms per ml. of solution and as determined in the following manner: each chicken weighing approximately 2¼ lbs. is carefully immersed in 1 liter of sterile distilled water for 5 minutes, after that the chicken is dipped an additional ten times and allowed to drain and then discarded. The rinse water now contains most of the surface microorganisms found on the bird. Depending upon the amount of spoilage, dilutions of the rinse waters are made in sterile distilled water and 1 ml. of each desired dilution is added to duplicate test tubes of nutrient agar. The tubes are then poured into sterile petri dishes; when hard they are inverted and stored at room temperature (24° C.) for 48 hours after which the individual colonies are counted. The following table illustrates the results of the above-described procedure:

TABLE I

*The effectiveness of chlortetracycline poultry dip in preserving poultry*

| Poultry Storage Time (Days in Ice) 3° C. | Chlortetracycline [1] in Dip Solution (P.P.M.) | Microorganisms Per Milliliter (In Thousands) | Acceptance by Taste Panel of 45 Families |
| --- | --- | --- | --- |
| 0 | 0 | 1.58 | Excellent Condition. |
|   | 10 | 1.58 | Do. |
| 7 | 0 | 520.0 | Do. |
|   | 10 | 1.0 | Do. |
| 14 | 0 | 605,000.0 | Slight Odor; unacceptable for sale. |
|   | 10 | 10.0 | Excellent Condition. |
| 21 | 0 | 3,700,000.0 | Slime, Putrid odor; objectionable. |
|   | 10 | 770.0 | Good; acceptable (No odor or slime). |

[1] Present as the hydrochloride of chlortetracycline.

The following procedures were used to illustrate the physical properties of the antibiotic and acid combinations: (1) chlortetracycline hydrochloride was made up at concentrations of 10,000 p.p.m., 5,000 p.p.m., and 1,000 p.p.m., in demineralized water. (2) The same concentrations were made up in Pearl River tap water. (3) The same concentrations were made up in hard water containing about 200 mg. $CaCl_2$ and 500 mg. $MgSO_4$ per liter. Aliquots of each of the above solutions were stored at 40° F., 70° F., and 90° F. Another set was made up in the same manner as in procedures (1), (2) and (3) above except an amount of citiric acid equal to the amount of chlortetracycline was added to each bottle.

The results of these tests are illustrated in the following tables:

TABLE II

*Physical observations*

| | | Scumming |
|---|---|---|
| 1. Deionized water | 10,000 p.p.m. | − |
| 2. Tap water | 10,000 p.p.m. | + |
| 3. Hard water | 10,000 p.p.m. | + |
| 4. Deionized water | 5,000 p.p.m. | − |
| 5. Tap water | 5,000 p.p.m. | + |
| 6. Hard water | 5,000 p.p.m. | + |
| 7. Deionized water | 1,000 p.p.m. | − |
| 8. Tap water | 1,000 p.p.m. | + |
| 9. Hard water | 1,000 p.p.m. | + |
| 10. Deionized water | 10,000 p.p.m. + citric | − |
| 11. Tap water | 10,000 p.p.m. + citric | − |
| 12. Hard water | 10,000 p.p.m. + citric | − |
| 13. Deionized water | 5,000 p.p.m. + citric | − |
| 14. Tap water | 5,000 p.p.m. + citric | − |
| 15. Hard water | 5,000 p.p.m. + citric | − |
| 16. Deionized water | 1,000 p.p.m. + citric | − |
| 17. Tap water | 1,000 p.p.m. + citric | − |
| 18. Hard water | 1,000 p.p.m. + citric | − |

The symbol "−" indicates no scumming; the symbol "+" indicates scumming.

TABLE III

*Precipitate and/or cloudiness on standing overnight (15 hours)*

| | Without Citric Acid | | | |
|---|---|---|---|---|
| | Deionized Water | Tap Water | Hard Water | pH |
| 1. 10,000 p.p.m. 40° F | − | − | − | 2.7 |
| 2. 10,000 p.p.m. 70° F | − | + | + | 2.6 |
| 3. 10,000 p.p.m. 90° F | − | + | + | 2.8 |
| 4. 5,000 p.p.m. 40° F | − | − | − | 2.8 |
| 5. 5,000 p.p.m. 70° F | − | + | + | 2.8 |
| 6. 5,000 p.p.m. 90° F | − | + | + | 2.9 |
| 7. 1,000 p.p.m. 40° F | − | − | − | [1]5.1 |
| 8. 1,000 p.p.m. 70° F | − | + | + | [1]5.1 |
| 9. 1,000 p.p.m. 90° F | − | + | + | [1]5.1 |

| | With Citric Acid | | | |
|---|---|---|---|---|
| | Deionized Water | Tap Water | Hard Water | pH |
| 10. 10,000 p.p.m. 40° F | − | − | − | 2.2 |
| 11. 10,000 p.p.m. 70° F | − | − | − | 2.3 |
| 12. 10,000 p.p.m. 90° F | − | − | − | 2.2 |
| 13. 5,000 p.p.m. 40° F | − | − | − | 2.5 |
| 14. 5,000 p.p.m. 70° F | − | − | − | 2.5 |
| 15. 5,000 p.p.m. 90° F | − | − | − | 2.5 |
| 16. 1,000 p.p.m. 40° F | − | − | − | 2.8 |
| 17. 1,000 p.p.m. 70° F | − | − | − | 1.8 |
| 18. 1,000 p.p.m. 90° F | − | − | − | 3.0 |

The symbol "−" indicates no precipitation or cloudiness; the symbol "+" indicates either precipitation or cloudiness or both.

[1] These pH values are for hard water only. In deionized water at 1,000 p.p.m. at each of the three temperatures, the pH was 3.3. In tap water at 1,000 p..m. at each of the three temperatures, the pH was 3.9. Each of the other fifteen pH values indicates the pH at that temperature and concentration in deionized water, tap water and hard water ±0.2 of a unit.

Oxytetracycline hydrochloride and tetracycline hydrochloride were tested under conditions identical to those of Tables II and III and produced results similar to those described above. In fact the scumming and precipitating effects observed with oxytetracycline hydrochloride were more pronounced than those observed with the other antibiotics.

In tap water and hard water a persistent and voluminous foam was formed on shaking. This foam could be prevented by (1) using deionized water and (2) use of citric acid. After 15 hours a dark brown precipitate settled out in all solutions of tap water and hard water which were stored at 70° F. and 90° F. except those containing citric acid. Thus this precipitate can be prevented by the following means: (1) refrigeration of the concentrate, (2) use of deionized water and (3) use of citric acid. It is to be noted that raised temperatures and increased ion content increases the amount of precipitate.

This application is a continuation-in-part of application Serial Number 557,436, filed January 5, 1956, now abandoned.

We claim:

1. A method for prolonging the useful shelf life of dressed poultry which comprises the step of immersing for at least one-half hour the dressed poultry into an aqueous solution containing about 3 to 30 p.p.m of an antibiotic selected from the group consisting of tetracycline, oxytetracycline, chlortetracycline and the acid and metallic salts thereof, and at least 3 p.p.m. of a solid non-toxic water-soluble acid.

2. A method for prolonging the useful shelf life of dressed poultry as in claim 1 wherein said antibiotic is chlortetracycline hydrochloride and said solid non-toxic water-soluble acid is citric acid.

3. A method for prolonging the useful shelf life of dressed poultry as in claim 2 wherein said chlortetracycline hydrochloride is present in an amount of about 10 p.p.m. and said citric acid is present in an amount of about 10 p.p.m.

4. A method for prolonging the useful shelf life of dressed poultry which comprises the step of immersing at least one half hour the dresesd poultry into an aqueous solution containing about 3–30 p.p.m. of an antibiotic selected from the group consisting of tetracycline, oxytetracycline, chlortetracycline and the acid and metallic salts thereof, at least 3 p.p.m. of a solid non-toxic water-soluble acid and about 60 to 240 p.p.m. of an inert non-toxic water-soluble diluent.

5. A method for prolonging the useful shelf life of dressed poultry as in claim 4 wherein said antibiotic is chlortetracycline hydrochloride, said solid non-toxic water-soluble acid is citric acid and said inert non-toxic water-soluble diluent is sodium chloride.

6. A method for prolonging the useful shelf life of dressed poultry as in claim 5 wherein said chlortetracycline hydrochloride is present in an amount of about 10 p.p.m., said citric acid is present in an amount of 10 p.p.m., and said sodium chloride is present in an amount of about 79 p.p.m 7 A method for prolonging the useful shelf life of dressed poultry as in claim 6, further characterized in that said aqueous solution contains a wetting agent in an amount of about 0.3 to 3 p.p.m.

References Cited in the file of this patent

UNITED STATES PATENTS

| 2,658,078 | Blase | Nov. 3, 1953 |
| 2,866,708 | Broquist et al. | Dec. 30, 1958 |

OTHER REFERENCES

Journal of Pharmacology and Experimental Therapeutics, Nov. 4, 1953, pp. 327 to 333 inclusive, article entitled The Enhancement of Chlortetracycline Absorptions By Citric Acid, by William D. Gray et al.

Food Technology, November 1954, pp. 503 to 505, inclusive, article entitled Antibiotics As Aids In Fish Preservation by Lionel Farber.

The Journal of The American Medical Association, Mar. 3, 1956, pp. 779 to 780, article entitled Chlortetracycline, A Food Preservative.